United States Patent [19]

Injerd

[11] 4,302,271

[45] Nov. 24, 1981

[54] COUNTERSINK NOZZLE FOR SEALANT APPLICATION

[75] Inventor: William G. Injerd, Seattle, Wash.

[73] Assignee: The Boeing Company, Seattle, Wash.

[21] Appl. No.: 96,858

[22] Filed: Nov. 23, 1979

[51] Int. Cl.$^3$ .......... B29C 27/16

[52] U.S. Cl. .......... 156/293; 156/242; 141/1; 141/392

[58] Field of Search .......... 141/1, 392, 311 R; 53/476; 138/89; 156/293, 242

[56] References Cited

U.S. PATENT DOCUMENTS 1,632,987 6/1927 Zerk .......... 141/311 R
4,213,490 7/1980 Knock .......... 141/311 R

*Primary Examiner*—Houston S. Bell, Jr.
*Attorney, Agent, or Firm*—Conrad O. Gardner; B. A. Donahue

[57] ABSTRACT

A sealant nozzle for applying sealant to the countersink surface of a drilled countersunk hole, the nozzle configuration including a circumferential groove on a conical surface for depositing the sealant in a confined region within the countersink, and a pilot portion for insertion into a bore associated with the countersink.

4 Claims, 6 Drawing Figures

Fig. 2
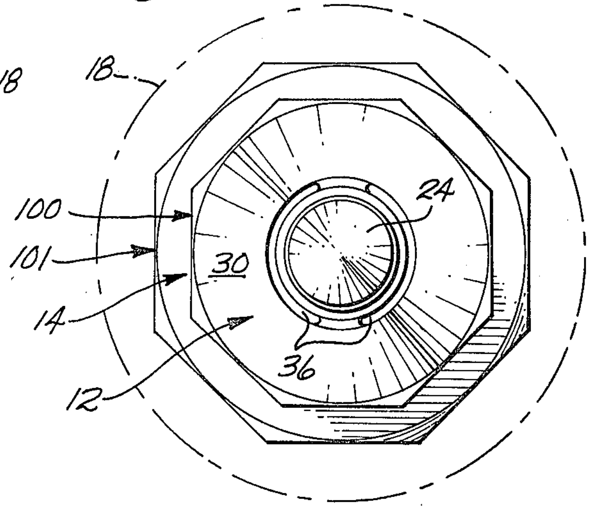
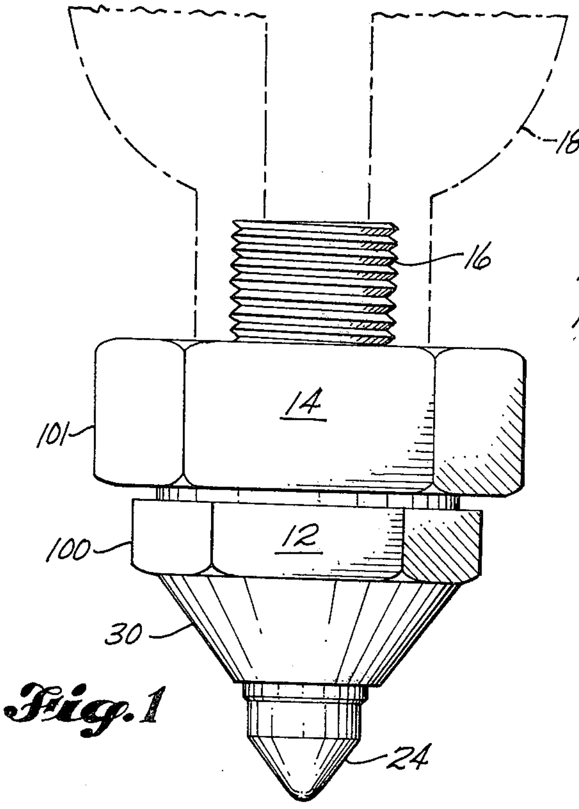
Fig. 1
Fig. 3
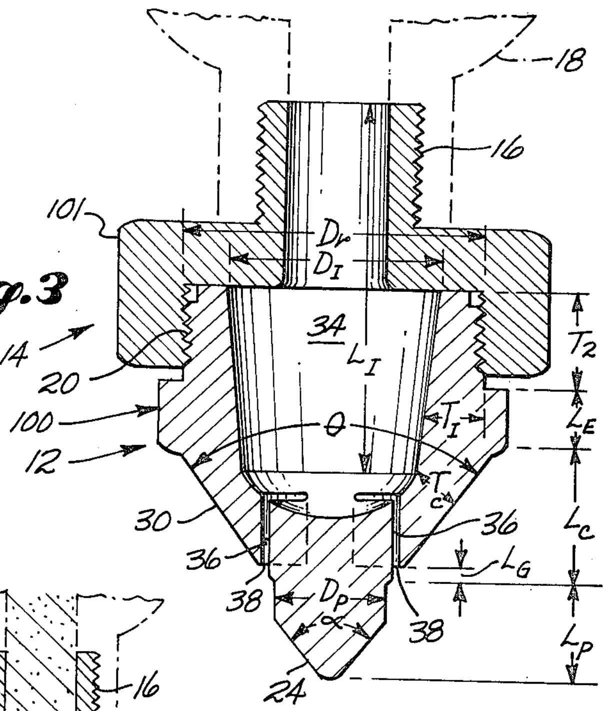
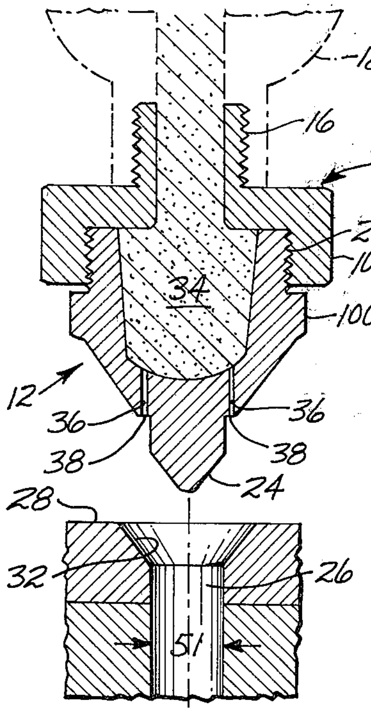
Fig. 4
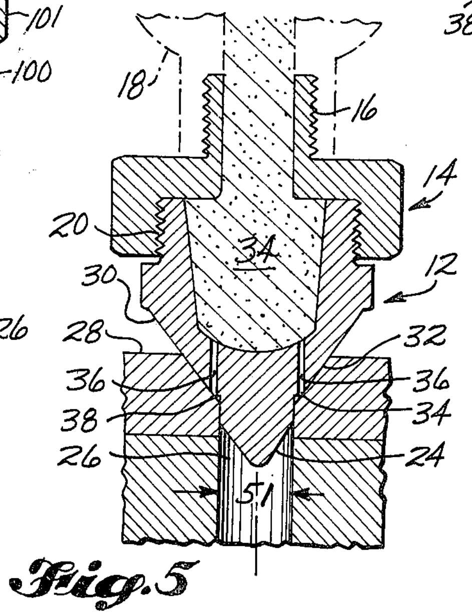
Fig. 5
Fig. 6
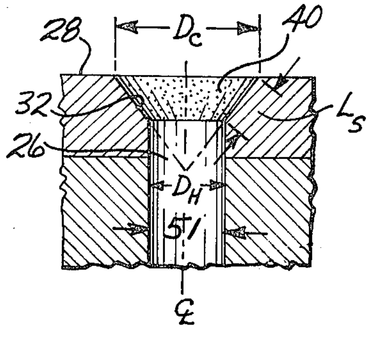

COUNTERSINK NOZZLE FOR SEALANT APPLICATION

This invention relates to sealant nozzles and more particularly to a sealant nozzle for applying a sealant to the countersink surface of a drilled countersunk hole.

Heretofore, sealant deposit apparatus have either deposited sealant throughout the length of the hole or allowed excessive sealant to extrude around the hole at the panel surface.

In U.S. Pat. No. 3,904,718 to Kuehn, Jr. issued Sept. 9, 1975 and assigned to the Boeing Company, assignee of this application, in a countersink sealant applicator, a tape was used to carry a ribbon of sealant that was transferred to a rotating applicator that applied the material to the countersunk surface. The Kuehn, Jr. applicator, however, has inherent transfer and excessive sealant problems.

It is accordingly an object of the present invention to provide sealant nozzle structure for applying sealant exclusively to the countersink surface of drilled countersunk holes.

It is a further object of the present invention to provide means in a sealant nozzle structure including a circumferential groove structure for directing the flow of sealant around the countersink.

It is yet another object of the present invention to provide a nozzle pilot structure in a sealant nozzle for preventing the flow of sealant into the hole as sealant is extruded out of the nozzle sealant exit means.

It is still another object of this invention to provide means in a sealant dispensing nozzle for restricting the flow of sealant to a circumferential groove in a cone surface portion of the nozzle.

It is a still further object of this invention to provide a sealant nozzle and universal adapter for coupling of various sealant nozzle sizes to sealant cartridges.

Other features and objects of the invention will be apparent from the following detailed description when read with the accompanying drawings. In the drawings:

FIG. 1 is a side elevational view of a sealant nozzle in accordance with an embodiment of the present invention;

FIG. 2 is a bottom view of the sealant nozzle shown in FIG. 1;

FIG. 3 is a side elevational view taken in section of the sealant nozzle of FIG. 1;

FIG. 4 is a side elevational view in section of the sealant nozzle of FIGS. 1 to 3 containing sealant prior to insertion of pilot nozzle portion thereof into a countersunk hole in a panel;

FIG. 5 is illustrative of the inserted sealant nozzle of FIG. 4 including a detailed showing of nozzle structure means for sealant retention around the countersink surface about the extrusion groove; and, FIG. 6 is illustrative of sealant application subsequent to nozzle removal wherein a continuous ring of sealant flow is deposited around the countersink surface portion of the panel hole.

Turning now to FIG. 1 it can be seen that the present nozzle 12 utilizes an adapter housing 14 having an upper threaded male type portion 16 for coupling to sealant cartridge 18 and a lower threaded female receiving type portion (as seen in FIG. 2) for receiving the threaded portion of nozzle 12.

Nozzle 12 in FIG. 1 is seen to include an end pilot portion 24 which as seen in FIGS. 4 and 5 is utilized to guide and insert nozzle 12 into hole 26 also serving the further function of insuring automatic alignment of nozzle 12 perpendicularly to panel surface 28 so that cone portion 30 of nozzle 12 correctly seats on countersink surface 32 (see FIG. 4). Sealant is extruded from nozzle interior chamber 34 (see FIGS. 3, 4, and 5) through a pair of vertical slots 36 (best seen in FIGS. 2 through 5) exiting from circumferentially disposed extrusion groove 38 in cone portion 30 to provide a continuous ring of sealant 40 (see FIG. 6) around the countersink 32 portion of hole 26. Instead of a pair of vertical slots 36 as shown, the passage between nozzle interior chamber 34 and circumferentially disposed extrusion groove 38 may comprise a plurality of individual holes forming several passages (not shown), however the preferred slots 36 are shown since allowing more rapid access and distribution of sealant to countersink surface 32. In passing it may be noted that nozzle 12 and adaptor housing 14 may be made by injection molded structures of low cost which may be discarded subsequent to use. While any type of durable plastic material could be used, injection molded polyethylene is preferable. End pilot portion 24 was designed in a working embodiment to fit within about 0.003 inches of the inner hole diameter 51 thereby preventing flow of sealant into hole 26 as sealant was extruded in the step shown in FIG. 5 out of vertical slots 36 into circumferentially disposed extrusion groove 38. At the upper edge of countersink surface 32, the matching flush surface of cone portion 30 restricts the sealant to the region of circumferentially disposed extrusion groove 38. The polygonally (octagonally) shaped peripheral outer surface 100 (as seen in FIG. 2) of nozzle 12 allows nozzle 12 to be easily gripped and screwed into sealant cartridge 18 either by hand or wrench. Similarly shaped peripheral outer surface portion 101 of adapter housing 14 also provides similar convenient manipulation thereof.

Features and design variables of countersink nozzle 12 keyed to identifying legends of FIG. 3 are shown below:

| Description | Symbol | Dimension Criterium | Tolerance |
|---|---|---|---|
| Pilot diameter | $D_p$ | Nominal diameter .003″ below hole diameter ($D_H$). | ±.002″ |
| Groove | G | Semicircular or triangular incut cross-section | |
| Groove incut | $I_G$ | For $D_H \leqq .325''$: .030″–.050″<br>For $D_H > .325''$: $I_G \leqq \frac{1}{3} L_S$ | ±.010″ |
| Cone length | $L_C$ | $L_C > .050'' + D_C \cos \frac{1}{2}\theta$<br>$L_C < (.25'' + \frac{1}{2} D_T) \sin \frac{1}{2}\theta$ | ±.010″ |
| Exterior length | $L_E$ | .20″–.50″ | ±.10″ |
| Groove position | $L_G$ | $\frac{1}{2} D \cos \frac{1}{2}\theta$ (groove centered on countersink surface) | ±.010″ |
| Chamber length | $L_I$ | Determine from drawing such that $T_c \doteq .125''$ | ±.010″ |
| Pilot length | $L_P$ | 1 to $1\frac{1}{2}$ times $D_P$ | ±.10″ |
| Nozzle length | T | Cut to fit sealant cartridge. Standard of Boeing: | |
| Thread length | $T_L$ | (a) $\frac{1}{4}-^{18}$ NPT<br>(b) .400″ | ±.050″ |
| Chamber diameter | $D_I$ | Determine from drawing such that: $T_I = 1/16'' \times \frac{1}{8}''$ (.0625″–125″) | ±.010″ |
| Cone | $\theta$ | Same as countersink | ±.5° |

-continued

| Description | Symbol | Dimension Criterium | Tolerance |
|---|---|---|---|
| angle | | angle, $\phi$<br>Cone $\Phi$ coincides with hole | |
| Pilot tip angle | $\alpha$ | 90° or may be same as $\theta$ | ±5° |

What is claimed is:

1. An apparatus for applying sealant material to the countersink surface portion only of a countersunk hole in a panel comprising:
   - a nozzle and an adapter housing for coupling said nozzle to a sealant cartridge;
   - said nozzle having a polygonally shaped peripheral outer surface portion enclosing an interior chamber, an end pilot portion, and an outer cone shaped surface portion intermediate said polygonally shaped peripheral outer surface portion and said end pilot portion;
   - a circumferentially disposed extrusion groove coaxially disposed about said outer cone shaped surface portion; and
   - a plurality of passages extending between said interior chamber and said circumferentially disposed extrusion groove for transmitting sealant from said interior chamber to the countersink portion only of a countersunk hole.

2. The invention according to claim 1 wherein said plurality of passages comprises a pair of vertically disposed slots.

3. The invention according to claim 1 wherein the diameter of said end pilot portion is about 0.003 inches below hole diameter.

4. A method for applying sealant material to the countersunk portion only of a countersunk hole comprising the steps of:
   - inserting the pilot portion of a nozzle into the hole,
   - further pushing said nozzle into the hole until a cone surface portion of the nozzle is in mating relationship with the countersunk portion of the hole thereby limiting further travel of said pilot portion into said hole,
   - dispensing a sealant through a circumferential groove in said cone surface portion around the countersunk portion of the hole, and then
   - withdrawing said nozzle from the hole.

* * * * *